United States Patent
Washiashi et al.

(10) Patent No.: US 10,834,907 B2
(45) Date of Patent: Nov. 17, 2020

(54) METHOD FOR CULTIVATING OYSTERS ON LAND

(71) Applicant: General Oyster, Inc., Tokyo (JP)

(72) Inventors: Kyoko Washiashi, Shimajiri-gun (JP); Keiichi Sato, Ginowan (JP)

(73) Assignee: GENERAL OYSTER, INC., Tokyo (JP)

( * ) Notice: Subject to any disclaimer, the term of this patent is extended or adjusted under 35 U.S.C. 154(b) by 418 days.

(21) Appl. No.: 15/550,873

(22) PCT Filed: Feb. 15, 2016

(86) PCT No.: PCT/JP2016/054218
§ 371 (c)(1),
(2) Date: Oct. 26, 2017

(87) PCT Pub. No.: WO2016/129703
PCT Pub. Date: Aug. 18, 2016

(65) Prior Publication Data
US 2018/0317460 A1 Nov. 8, 2018

(30) Foreign Application Priority Data

Feb. 13, 2015 (JP) .................................. 2015-026534

(51) Int. Cl.
*A01K 61/54* (2017.01)
(52) U.S. Cl.
CPC ............... *A01K 61/54* (2017.01); *Y02A 40/81* (2018.01)
(58) Field of Classification Search
CPC ........ A01K 61/54; A01K 61/50; A01K 61/00; A01K 63/04; A01K 67/033; A23L 17/20; A61K 35/618

(Continued)

(56) References Cited

U.S. PATENT DOCUMENTS

| 3,495,573 A | 2/1970 | Vanderborgh |
| 3,526,209 A | 9/1970 | Budge |

(Continued)

FOREIGN PATENT DOCUMENTS

| CN | 101680100 A | 3/2010 |
| CN | 101843225 A | 9/2010 |

(Continued)

OTHER PUBLICATIONS

Lin Jinrong et al., "Application of Deep-sea Water in Aquatic Breeding and Its Development Potentials," AgBio Innovation, Jun. 30, 2007.

(Continued)

*Primary Examiner* — Yvonne R Abbott-Lewis
(74) *Attorney, Agent, or Firm* — Fitch, Even, Tabin & Flannery, LLP

(57) ABSTRACT

An object of the present invention is to provide oysters which are highly safe and not contaminated with microorganisms including viruses and bacteria, the oysters moreover being fresh and having high nutritional value, and being available throughout the year in the same state as oysters from the in-season period. Provided is a method for cultivating oysters on land, the method including growing oyster larvae into adult shellfish in seawater containing deep-sea water in a water tank through feeding microalgae cultured in seawater containing deep-sea water to the oyster larvae. Specifically, provided is a method for cultivating oysters on land, the method including growing oysters in a suspension system including seedling collectors suspended vertically or horizontally on ropes by allowing deep-sea water to continuously flow through the system without stagnation or repeatedly allowing deep-sea water to stagnate and continuously flow through the system without stagnation at a given (Continued)

interval at a seawater temperature of 10° C. to 30° C. for 5 months to 18 months.

12 Claims, 6 Drawing Sheets

(58) Field of Classification Search
USPC .............. 119/200, 234, 236, 244, 252, 260
See application file for complete search history.

(56) References Cited

U.S. PATENT DOCUMENTS

| | | | | |
|---|---|---|---|---|
| 3,650,244 | A * | 3/1972 | Fordham | A01K 61/54 119/237 |
| 5,749,319 | A * | 5/1998 | Hirose | A01K 61/54 119/244 |
| 6,357,392 | B1 * | 3/2002 | Ido | A01K 61/54 119/252 |
| 6,986,323 | B2 * | 1/2006 | Ayers | A01K 61/00 119/200 |
| 7,147,921 | B2 * | 12/2006 | Camp | C09D 5/1618 428/418 |
| 9,012,513 | B2 * | 4/2015 | Watanabe | C09K 15/08 514/718 |
| 9,629,880 | B2 * | 4/2017 | Watanabe | A23L 33/10 |
| 9,745,237 | B2 * | 8/2017 | Watanabe | C07C 37/004 |
| 2010/0236137 | A1 * | 9/2010 | Wu | C10L 1/026 44/385 |
| 2010/0263600 | A1 * | 10/2010 | Lebrun | A01K 67/033 119/234 |
| 2012/0184001 | A1 * | 7/2012 | Stephen | A01K 61/60 435/134 |
| 2012/0202279 | A1 | 8/2012 | Murahara | |
| 2015/0223435 | A1 * | 8/2015 | Kojima | A01K 61/54 119/236 |
| 2018/0288980 | A1 * | 10/2018 | Boyle | A01K 61/54 |

FOREIGN PATENT DOCUMENTS

| | | | | |
|---|---|---|---|---|
| FR | 2169239 | A1 * | 9/1973 | ............. A01K 61/54 |
| JP | H10-234248 | A | 9/1998 | |
| JP | H11-32619 | A | 2/1999 | |
| JP | 2000-354434 | A | 12/2000 | |
| JP | 2008-206437 | A | 9/2008 | |
| JP | 2009-38999 | A | 2/2009 | |
| JP | 2014-018099 | A | 2/2014 | |
| KR | 2014-0078038 | A | 6/2014 | |

OTHER PUBLICATIONS

Office action in counterpart Taiwanese application No. 105104266 dated Aug. 16, 2019.
Ponis et al., Pavlova lutheri: Production, preservation anduse as food for Crassostrea gigas larvae, Elsevier, Aquaculture, vol. 282, 2008, p. 97-103.
Search Report of EP Appln. 16749343 dated Oct. 2, 2018 in English.
International Search Report for PCT/JP2016/054218 dated Mar. 22, 2016; English translation submitted herewith (5 pages).
Koji Otsuka, "Deep Ocean Water Utilization—State of the Art and View—", Nippon Hakuyo Kikan Gakkaishi, 1998, vol. 33, No. 2, pp. 140 to 148.
Heisei 24 Nendo Hiroshimawan-nai San Kaki no Jukinzoku Shiken Kekka, Heisei 24 Nendo Hiroshima-Shi Eisei Kenkyusho Nenpo, 2013, vol. 32.
Tang Xinqiang et al., Application Status of Deep Ocean Water for Aquaculture in Japan, Fisheries Science, vol. 25, Issue 9, Sep. 2006 (cited in an office action in counterpart CN Appln. No. 201680015507.1 dated Mar. 2, 2020).
Li Mingjie et al., Development and Utilization Status of Deep Ocean Water Abroad and Future Development Vision of China, Ocean Development and Management, Issue 5, 2012 (cited in an office action in counterpart CN Appln. No. 201680015507.1 dated Mar. 2, 2020).

* cited by examiner (a)

(b)

(c)

Marine cultivation　　　　　　On-land cultivation

METHOD FOR CULTIVATING OYSTERS ON LAND

CROSS-REFERENCE TO RELATED APPLICATIONS

This application is a U.S. national phase application filed under 35 U.S.C. § 371 of International Application PCT/JP2016/054218, filed on Feb. 15, 2016, designating the United States, which claims benefit of the filing dates of JP 2015-026534, filed Feb. 13, 2015, which is hereby incorporated herein by reference in its entirety.

TECHNICAL FIELD

The present invention relates to a method for cultivating oysters on land with seawater containing deep-sea water, and, specifically, relates to a method for cultivating oysters on land, the method including growing oyster larvae hatched after seedling collection into adult shellfish in seawater containing deep-sea water through feeding microalgae cultured in seawater containing deep-sea water to the oyster larvae.

BACKGROUND ART

Japanese oysters (*Crassostrea gigas*) are in season from November to May, and rock oysters (*Crassostrea nippona*) from June to August, which is before their spawning season, in the Japanese aquaculture industry, in terms of the form of reproduction of oysters. On the coming of the in-season period, oysters begin to take in a large volume of feed in seawater to accumulate nutrients for subsequent spawning, and grow into nutrient-rich, fat oysters. After spawning, oysters become thin in oligotrophic state, and lose the original taste and only a salty taste is left. For this reason, it is difficult to supply Japanese oysters from June to October and rock oysters from September to May in Japan. Seawater temperature and feed in seawater are important for oysters to grow, and oysters grow into adult shellfish over two years in many sea areas in Hokkaido and Sanriku regions, where the seawater temperature is low. On the other hand, oysters are known to grow into adult shellfish within a year in sea areas where the seawater temperature is high and plankton (microalgae) as feed for oysters is abundant.

In view of such circumstances, cultivation methods to grow into adult shellfish in a short period (PTLs 1 and 2) and cultivation methods allowing reduction of the load required for cultivation (PTLs 3 and 4) have been proposed.

CITATION LIST

Patent Literature

PTL 1: JP 10-234248 A
PTL 2: JP 2008-206437 A
PTL 3: JP 11-32619 A
PTL 4: JP 2014-18099 A

SUMMARY OF INVENTION

Technical Problem

However, the cultivation methods described in the PTLs are all relate to cultivation with surface water from a sea area. Such cultivation with surface water from a sea area raises the following concerns.

Sea areas for cultivation may be contaminated with viruses or bacteria at any time throughout the year. For example, sea areas are the most contaminated with noroviruses from late December to early March, when an epidemic of norovirus infections in humans reaches a peak. Vomit and feces from humans infected by noroviruses are directly discharged from purification facilities into the ocean without complete sterilization, and oysters circulate such contaminated seawater in the body, and as a result incorporate noroviruses in the seawater into the body and become contaminated with the noroviruses. In addition, sludge in rivers flows into sea areas after a heavy rain or typhoon in summer, and the seawater becomes contaminated with bacteria including soil-derived general bacteria and coliform bacteria to a high level, and eventually the concentration of contaminants in oysters increases.

To purify such contaminated oysters, purification through stocking (treatment of oysters in UV-sterilized seawater or artificial seawater without feeding) is commonly employed. However, contaminants such as noroviruses may be incorporated in the microstructure in the midgut gland of an oyster, and thus complete purification (discharge from the inside of the body of an oyster) may not be achieved. In summary, an oyster having any experience of being exposed to a sea area has a risk of viruses difficult to discharge.

In summer, when rock oysters come in season, sea areas are highly contaminated with shellfish poisons, which causes inhibition of distribution and consumption of oysters to be eaten raw.

Accordingly, an object of the present invention is to provide a method for cultivating oysters on land, wherein the method enables production of virus-free oysters having no experience of being exposed to a sea area, requiring no purification through stocking, and being available throughout the year in the same state as oysters from the in-season period, and thereby the present invention solves the above-mentioned problems.

Solution to Problem

The present inventors diligently studied to solve the above-mentioned problems, and found that cultivation of oysters on land with microalgae cultured by using seawater containing deep-sea water can solve the above-mentioned problems, and thus completed the present invention. Specifically, the present invention is as follows.

(1) A method for cultivating oysters on land, the method including growing oyster larvae into adult shellfish in seawater containing deep-sea water in a water tank through feeding microalgae cultured in seawater containing deep-sea water to the oyster larvae.

(2) The method for cultivating oysters on land according to the above (1), wherein the oyster larvae are oyster larvae having no experience of being exposed to a sea area.

(3) The method for cultivating oysters on land according to the above (2), wherein the oyster larvae having no experience of being exposed to a sea area are derived from fertilization and hatching in a water tank.

(4) The method for cultivating oysters on land according to any one of the above (1) to (3), wherein seedling collection is performed in deep-sea water in a water tank.

(5) An oyster having a copper content of less than 1000 μg per 100 g of an edible part, a cadmium content of less than 70 μg per 100 g of an edible part, and an iron content of 5000 μg or more per 100 g of an edible part.

(6) An oyster having a copper content of less than 1000 μg per 100 g of an edible part, a cadmium content of less than 70 µg per 100 g of an edible part, and a magnesium content of 70000 µg or more per 100 g of an edible part.

(7) The oyster according to the above (5) or (6), being norovirus-free.

With respect to growing conditions in the method for cultivating oysters on land, it is preferred to cultivate oysters in seawater containing deep-sea water in a water tank, in a suspension system including seedling collectors (cultches) suspended vertically or horizontally on ropes or wires, or in a system in which oysters attached to ground shells or oysters which have been allowed to attach to flexible substrates to grow to a shell length of about 3 cm and then detached are contained in nets or baskets, by allowing seawater containing deep-sea water to continuously flow through the system without stagnation or repeatedly allowing seawater containing deep-sea water to stagnate and continuously flow through the system without stagnation at a given interval at a seawater temperature of 10° C. to 30° C., preferably 10° C. to 25° C., for 5 months to 18 months. The flow rate of seawater containing deep-sea water in a water tank is preferably a flow rate such that deep-sea water in a volume corresponding to the capacity of the water tank undergoes 0.5 to 5.0 turnovers per day.

In the cultivation method according to the present invention, growing conditions are preferably changed in accordance with the growth state of oysters, and it is preferred to grow in deep-sea water initially at a seawater temperature of 15 to 28° C. for juvenile shellfish, and then grow in seawater containing deep-sea water at a seawater temperature of 10 to 25° C. for adult shellfish. In the case that the gonad is controlled for spawning, it is preferred to grow at a higher temperature of 13° C. to 30° C.

The period for growing juvenile shellfish in deep-sea water at a seawater temperature of 15 to 28° C. is preferably 4 months to 15 months, and the period for growing adult shellfish at 10° C. to 25° C. is preferably 1 month to 5 months.

Advantageous Effects of Invention

Since oysters are cultivated in seawater containing clean deep-sea water in the method for cultivating oysters on land according to the present invention, the oysters are essentially at least free of contamination with viruses derived from human excretion such as noroviruses, hepatitis A viruses, hepatitis E viruses, sapoviruses, and rotaviruses, and marine-derived contaminants causing diseases to humans and oysters such as oyster herpes viruses, *Bonamia* spp., and shellfish poisons, and thus fresh oysters which are extremely safe and essentially free of viruses, microorganisms, and bacteria having impact on the human body via an oyster itself can be provided throughout the year, regardless of the in-season period. Further, the present invention can provide an oyster having high mineral contents and low heavy metal contents. Furthermore, the present invention can provide an oyster having high mineral contents and low heavy metal contents and being norovirus-free. A "norovirus-free" oyster refers to an oyster for which no norovirus is detected in real time PCR described in Examples in the present specification.

While it generally takes 1 to 2 years to grow into adult shellfish in a sea area, the present invention can shorten the period through water temperature control.

Moreover, the cultivation according to the present invention can provide an oyster having nutritional value higher than or comparable to that of an oyster cultivated in a sea area.

Since the on-land cultivation according to the present invention does not suffer from contamination with poisonous plankton in contrast to marine cultivation, accumulation of shellfish poisons in the body of a oyster caused by intake of such plankton does not occur, and thus high safety can be ensured also with respect to shellfish poisons.

BRIEF DESCRIPTION OF DRAWINGS

In FIG. 3, (a) to (d) are photographs showing the state immediately after feeding, 1 hour after feeding, 2 hours after feeding, and 3 hours after feeding, respectively.

In FIG. 4, (a) to (I) are photographs showing the state of seawater before feeding, at initiation of feeding (hour 0), 1 hour after feeding, 2 hours after feeding, 3 hours after feeding, 4 hours after feeding, 7 hours after feeding, 12 hours after feeding, and 24 hours after feeding, respectively.

In FIG. 5, the oyster in the right side of the photograph was grown through feeding in a dropping method with continuous charging, and the oyster in the left side of the photograph was grown through feeding in a batch method with intermittent feeding.

In FIG. 6, (a), (b), and (c) show the outer appearance, the molluscous part in a shell, and the molluscous part after being shelled, respectively. In each of the photographs, the right side in the photograph is an oyster derived from the on-land cultivation according to the present invention, and the left side is an oyster derived from conventional marine cultivation.

In FIG. 7, (a), (b), (c), (d), (e), (f), (g), and (h) show sodium contents, potassium contents, calcium contents, magnesium contents, iron contents, zinc contents, copper contents, and cadmium contents, respectively. "Marine oyster" and "Land oyster" in FIG. 7 refer to oysters derived from common marine cultivation and oysters derived from the on-land cultivation according to the present invention, respectively, and concentrations of each component are each represented as the average value of six samples.

DESCRIPTION OF EMBODIMENTS

Figure 1:
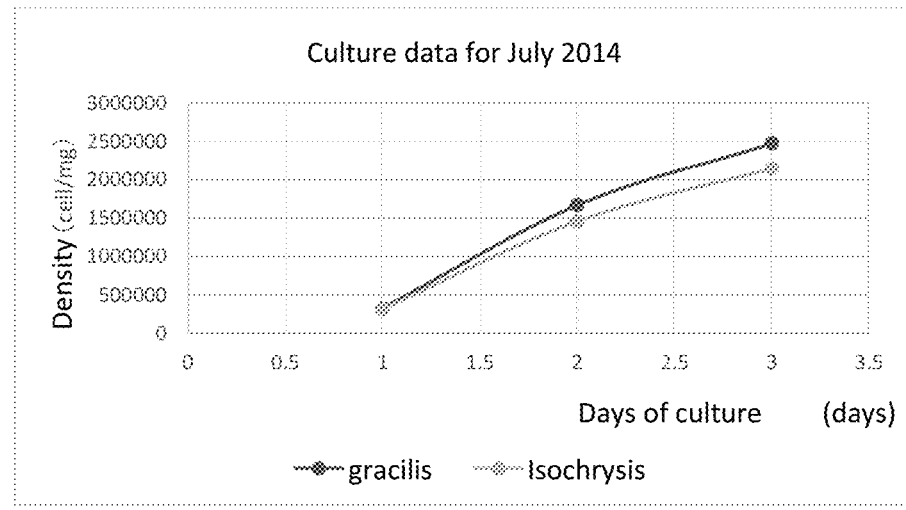
FIG. 1 is a graph showing a relation between days of culturing and cell density when microalgae were cultured in summer (July).

The on-land cultivation method according to the present invention includes: a step of feeding microalgae cultured by using seawater containing deep-sea water; and a step of growing oysters into adult shellfish in a water tank filled with seawater containing deep-sea water while the microalgae obtained in the previous step are fed thereto. Specifically, it is required to culture an appropriate quantity of microalgae of an appropriate type according to the growing process of oysters in the seawater containing deep-sea water and stably feed them to oysters, and to develop a growing environment including retention of seawater temperature suitable for growing of oysters.

In the present invention, on-land cultivation of virus-free oysters is performed in which seawater containing deep-sea water is used as rearing water for oysters, microalgae as feed for oysters are cultured by using seawater containing deep-sea water and fed to oysters, and control of the rearing environment including water temperature control is performed.

The deep-sea water contained in the seawater to be used for culture of microalgae and growing of oysters in the present invention is seawater pumped up from the depth of 200 m to 700 m, and contains inorganic nutrients including oxalate nitrogen, phosphate phosphorus, and silicon without being impacted by discharge from human activities or river water contaminated with chemicals or the like, and thus characterized by absence of microorganisms including pathogenic bacteria and viruses possibly harmful to the human body, and by cleanness in a chemical sense. In addition, phytoplankton cannot photosynthesize in the deep layer, and as a consequence inorganic substances coming from the surface layer of sea water to the deep layer accumulate in deep water without being consumed. For this reason, deep-sea water is rich in inorganic nutrients, which are required for the growth of phytoplankton as feed for oysters, and this property is called "inorganic eutrophy" of deep-sea water.

Many intake facilities for such deep-sea water are known in the world, including those in Nyuzen Town, Toyama Prefecture, Japan, Kumejima Town, Okinawa Prefecture, Japan, and Muroto City, Kochi Prefecture, Japan, and deep-sea water taken by any facility, not just existing intake facilities, can be used. These deep-sea waters are all excellent in cleanness and inorganic eutrophy as described above, and any of the deep-sea waters can be appropriately selected for use in consideration of a place where cultivation and/or stocking is actually performed, for example, in consideration of a cultivation and/or stocking facility. Deep-sea waters from a plurality of origins may be mixed for use. Deep-sea water taken can be directly used without need of sterilization or filtration before use. The seawater containing deep-sea water to be used in the present invention is only required to be seawater containing deep-sea water. However, the seawater preferably contains 50% or more of deep-sea water, more preferably 70% or more of deep-sea water, and even more preferably 90% or more of deep-sea water, for satisfactory growing. It is also preferred to use pure deep-sea water. In this case, the term "pure deep-sea water" encompasses deep-sea water containing an impurity commonly contained in deep-sea water. The seawater containing deep-sea water can be obtained by appropriately mixing seawater with deep-sea water. Examples of seawater to be mixed with deep-sea water include artificial seawater, sterilized surface seawater, and seawater pumped up from a depth deeper than 200 m to 700 m. Freshwater may be added in an amount such that the freshwater does not influence on the characteristics of deep-sea water including inorganic eutrophy.

The growing of oysters employed in the present invention is performed through introducing seawater containing deep-sea water into a water tank containing oysters and allowing the seawater containing deep-sea water to continuously flow through the water tank without stagnation. The term "continuously flow without stagnation" here refers to, but is not limited to, discharging seawater containing deep-sea water introduced into a water tank through an outlet of the water tank without circulating in the water tank, and the seawater containing deep-sea water can be allowed to spill out of the water tank without discharging through an outlet. In addition, the seawater containing deep-sea water may be allowed to continuously flow without stagnation as needed, or may be allowed to stagnate only in feeding, and the flow rate may be controlled in accordance with the dissolved oxygen concentration of the seawater and the amount of feces, as organic matters, from oysters.

The flow rate of the seawater containing deep-sea water required for allowing it to continuously flow without stagnation is represented as the quantity of the seawater containing deep-sea water introduced into and simultaneously discharged from a water tank relative to the capacity of the water tank. Specifically, the flow rate of the seawater containing deep-sea water to be continuously flown without stagnation, as represented as a turnover rate obtained by dividing the total quantity of the seawater containing deep-sea water introduced into a water tank per day by the capacity of the water tank, is preferably a flow rate corresponding to 0.5 to 5.0 turnovers per day. The flow rate is preferably appropriately changed in accordance with the state of growing oysters, and the flow rate is preferably a flow rate corresponding to 1.0 to 2.0 turnovers for larvae, 1.0 to 2.5 turnovers for juvenile shellfish, and 2.0 to 3.0 turnovers for adult shellfish. The supply rates of the seawater containing deep-sea water in these ranges enable stable supply of the seawater containing deep-sea water and maintenance of a good aqueous environment without causing any stress on oysters.

The flow rate may be a flow rate corresponding to 0 turnovers, i.e., no flow-in of the seawater containing deep-sea water is permitted from the viewpoint of growing of oysters, as long as the duration is restricted. However, in consideration of contamination in the water tank, it is preferred to ensure an flow-in rate such that contaminants in a water tank can be flushed out, for which the flow rate is preferably 1.0-fold or higher.

To control the introduction rate and discharge rate of the seawater at a constant value, a cycle may be repeated in which discharging is initiated through the siphon action once the water level is raised through supply of seawater to reach a given level, and the discharging is terminated when the water level is lowered to the given water level, or a simple method such as over flow may be employed.

Basically, the deep-sea water to be introduced can be directly used without need of any treatment for full utilization of the cleanness.

Meanwhile, the effluent containing organic matters including residual, untaken microalgae and feces from oysters after allowing the seawater to continuously flow without stagnation can be reused through treatment such as filtration, or can be secondarily used, for example, for cultivation of sea cucumbers or regeneration of seaweed beds.

The oyster to be cultivated in the present invention may be any of oyster species including the Japanese oyster originated from Japan, the rock oyster originated from Japan, and oysters originated from countries other than Japan, and these oysters can be used if artificial seedlings thereof are available.

Artificial seedlings can be obtained by fertilization of eggs from oysters grown to adult shellfish through the present invention, and fertilization and seedling collection can be performed in the seawater containing deep-sea water.

Even if seedlings collected in common seawater or commercially available seedlings are used for growing of oysters, they are to be grown thereafter in the seawater containing deep-sea water with cleanness, and thus the possibility of contamination of oysters is extremely small as described above. For this reason, fertilization and seedling collection are not necessarily required to be performed in the seawater containing deep-sea water. However, it is preferred to perform fertilization and seedling collection also in the seawater containing deep-sea water because the influence of contamination can be completely excluded.

"Oyster larvae having no experience of being exposed to a sea area" in the present invention refer to oyster larvae for which fertilization and hatching have been performed in a water tank and seedling collection has been performed not in a sea area but in the water tank, or oyster larvae having no experience of being immersed in a sea area after such seedling collection.

In the on-land cultivation of oysters according to the present invention, it is preferred to grow with the temperature of the seawater containing deep-sea water set within about 10° C. to 30° C., preferably within about 10° C. to 25° C., for about 5 to 18 months. It is more preferred in the planktonic larval stage and juvenile stage, in which oysters actively grow, to grow with the temperature set within 15° C. to 25° C., in which the metabolic activity is kept high, for 4 to 15 months, and in the adult stage to grow with the temperature set within a low temperature range of 10° C. to 15° C., in which a satisfactory size of the molluscous part is maintained, for about 1 to 5 months.

It is preferred for controlling the gonad for fertilization in the spawning stage to set the temperature within 13° C. to 28° C., preferably within a high temperature range of 20° C. to 28° C., and it is preferred in the resting stage after spawning to set the temperature within 13° C. to 18° C., and it is most preferred that the temperature in the spawning stage be 25° C. and the temperature in the resting stage be 15° C.

In growing of oysters, it is known that when a cumulative value of daily average temperature for 10° C. or higher reaches 600° C., the gonad of an oyster matures and the oyster becomes capable of spawning and thus comes into the spawning stage, and that a temperature of 23° C. or higher is required for spawning. Accordingly, through regulation of the water temperature so as to achieve such a cumulative time, oysters in the spawning stage, i.e., in-season oysters before spawning can be obtained at any time. In addition, new larvae derived from spawning can be collected through seedling collection for cultivation.

When the water temperature is regulated, the water temperature is preferably set within 20 to 30° C. once the molluscous part accumulates nutrients to become sufficiently fat in the resting stage. Thus, oysters can be induced into the spawning stage through adjustment of the seawater temperature, and in-season oysters before spawning can be obtained. In addition, oysters in the spawning stage can be allowed to spawn for cultivation of next-generation oysters.

It is preferred to feed microalgae obtained in culture to be described later by using an intermittent batch feeding method in which a given quantity of feed is charged into the seawater one to five times per day, or by using a dropping method in which a given quantity of feed is continuously charged into the seawater for a given period. More preferred for oyster growth is the dropping method, in which the microalgal concentration in the seawater is kept in a constant density.

Regarding the rearing density allowing oysters to grow satisfactorily, the turnover rate is preferably set so that each oyster can take in algae at about 50000 to 100000 cells/hour.

If the turnover rate is set higher, then flow-out of feed increases, and thus preparation of a huge quantity of microalgal feed through culturing is required, and availability for oysters is lowered.

The lower limit of the turnover rate relates to the supply rate of oxygen. For example, about 8 mL of oxygen is typically dissolved per liter of seawater (temperature: 20° C.), and an oyster consumes 2 mL of oxygen per hour assuming that the weight of the molluscous part of an oyster having a size suitable for shipping is 10 g. Consequently, in the case that 500 oysters are placed in 2 t of seawater, the turnover rate is preferably 2 to 5 turnovers/day. In this case, oxygen deficiency is not caused until 16 liters of oxygen contained in 2 t of seawater is consumed to be 4 liters, and oxygen is enough for 12 hours under stagnation.

While these calculations are for the case that the water temperature is 20° C., consumption of oxygen increases by 40% at a water temperature of 25° C., and decreases by 20% at 15° C. Thus, calculation is needed to be in accordance with the water temperature.

The number of oysters in a water tank is needed to be controlled in each stage of growth of the oysters so that each oyster can sufficiently access microalgal feed and oxygen. For example, a 3000 L water tank is suitable for about 1000 oysters as adult shellfish, and the number of oysters can be increased or decreased in accordance with the dissolved oxygen concentration or pH of the seawater, and is an item to be considered in the aspect of productivity.

For supply of oxygen and stirring, it is preferred to perform aeration for a water tank to grow oysters therein, and the intensity of aeration is adjusted to prevent retention of the seawater by using an aeration apparatus so that an environment in which the oxygen is uniformly supplied and the seawater is homogeneously circulating is achieved.

The cultivation of oysters according to the present invention can be performed in the same manner as common marine cultivation of oysters, except that the seawater containing deep-sea water is used and cultured microalgae are fed.

Specifically, the cultivation includes steps of seedling collection, suppression, main suspension, shallow-hanging growing, and harvesting.

(1) Seedling collection refers to collection of oyster larvae from the ocean, and is a step of allowing a huge number of eggs released in seawater during the egg release (spawning) period to attach to shells (e.g., scallop shells), called cultches or collectors, sunk in seawater. The step of seedling collection may be performed without the seawater containing deep-sea water, as described above. However, seedling collection is preferably performed in the seawater containing deep-sea water in a water tank.

The larvae obtained through such seedling collection and attached to cultches, which correspond to the oyster larvae having no experience of being exposed to a sea area, grow into juvenile shellfish.

(2) Suppression is a step of training juvenile shellfish generally by utilizing the tide. In this step, juvenile shellfish are allowed to eat marine plankton at high tide, and exposed to the sunlight to open and close the shell at low tide, thereby training the juvenile shellfish and forcing weak shellfish to drop out, for the purpose of reducing the mortality rate of oysters in the next step. When the larvae attaching to the cultches grow into juvenile shellfish, the cultches are stacked at an interval of about 1.5 to 3 cm with a rope or wire penetrating therethrough to produce suspension lines, and the suspension lines are hung on a rack called suppression rack to preform suppression as described above.

Although this step is not necessarily required for the on-land cultivation method according to the present invention, which utilizes the seawater containing deep-sea water with high cleanness, the step of suppression can be conducted through providing drying by adjustment of the level of the seawater containing deep-sea water in a water tank, in order to inhibit excessive intake of feed and give stress to make the molluscous part firm.

(3) Main suspension is a step in which the cultches to which the juvenile shellfish after suppression are attaching are "rearranged" at a cultch-cultch interval of about 15 cm, and ropes or wires with the rearranged cultches (suspension lines) are hung on a raft into a sea area for cultivation to grow the juvenile shellfish. Also in the growing method according to the present invention, rearrangement by widening the cultch-cultch interval is performed so as not to inhibit the growth of oysters, and the rearranged cultches are hung in a water tank filled with the seawater containing deep-sea water for cultivation. In cultivation, feeding of microalgae is performed.

(4) Shallow-hanging growing is a step of allowing the oysters after main suspension to continuously grow until harvesting. In general, suspension lines are occasionally hung deep in seawater to prevent retardation of growth or mortality due to high temperature near the sea surface and attachment of harmful organisms (e.g., mussels, barnacles). In the growing method according to the present invention, in contrast, the seawater temperature can be adjusted and harmful organisms to attach to oysters are absent, and thus the positions of suspension lines are not required to be changed during growing, and oysters can be directly grown in the state of (3) main suspension.

(5) Harvesting is generally performed through craning suspension lines from a fishing vessel with a crane for oyster fishing, and the oysters are thereafter subjected to washing with a high-pressure water jet, removal of barnacles or the like with a polishing machine or by hand, sorting, purification/sterilization, and so on, and then shipped. Oysters obtained in the on-land cultivation method according to the present invention are clean and do not require removal of barnacles or the like, and purification/sterilization and stocking or the like for removal of viruses or the like are also unnecessary. While suppression, main suspension, and shallow-hanging growing are each performed after transferring a raft hanging suspension lines to a sea area meeting the requirement of each step in marine cultivation, the on-land culture according to the present invention allows adjustment of the environment in a water tank, and thus oysters can be grown in a water tank without transfer. This allows oysters to take in a necessary and sufficient quantity of feed, and as a result excellently fat oysters can be obtained. In addition, it is clear that the on-land cultivation method according to the present invention can be composed of fewer steps than common marine cultivation, and the steps require less effort than common marine cultivation.

In place of a cultivation method with suspension lines as commonly employed in cultivation of oysters, cultivation can be performed by using, what is called, a "single seed" method. In contrast to the method with suspension lines, in which many oysters grow on each cultch in a suspension line, the single seed method is a method in which individual oysters are separately grown, and, in this method, eggs are collected and the larvae hatched are allowed to attach to a shell powder or a flexible substrate for seedling collection, and then grown to obtain juvenile shellfish, and the juvenile shellfish grown to a certain degree are subsequently put in a cage to grow them until they grow into adult shellfish. Since oysters are not densely cultivated in this cultivation method, in contrast to cultivation with cultches, and thus plankton as feed is evenly available for all oysters in this cultivation method, the method is excellent in that oysters with constant quality can be obtained at a high yield. This cultivation method is also applicable to the on-land cultivation method according to the present invention, which is a preferred form of cultivation from the viewpoint that no suspension line is used. In such a single seed cultivation method, for example, larvae are grown with cultches into juvenile shellfish, and then the juvenile shellfish are removed from the cultches and put in a cage or the like, and thus individual oysters can be separately grown into adult shellfish.

Now, culture of microalgae to be fed for growing will be described.

Since the sun light does not reach the deep layer, phytoplankton cannot grow therein. On the other hand, organic matters including dead bodies of zooplankton and phytoplankton grown in the surface layer sink to the deep layer, and inorganic substances resulting from decomposition and/or digestion accumulate in the deep water. Accordingly, deep-sea water is rich in inorganic nutrients required for the growth of phytoplankton (microalgae) as feed for oysters, while phytoplankton itself, as a feed for oyster, is absent in deep-sea water. For this reason, cultivation by using deep-sea water requires culture of phytoplankton or purchase of commercially available feed.

With respect to culture of microalgae as feed for oysters, the quantity of microalgae required to charge for one average-sized oyster (including the shell) with a weight of 100 g per day is 1 liter in the case of *Chaetoceros gracilis* in a culture density of 1000000 cells/mL. In the case of middle-scale cultivation of 3000 oysters, 3000 liters/day is required, and thus stable culture is required, by any means, such that a cell content as high as possible is achieved, for example, a density of 10000000 cells/mL or higher is achieved.

Since microalgae in the logarithmic proliferation phase, in which microalgal cells continuously proliferate, serve as fresher, well-conditioned feed for oysters the cells of which are intended to be activated, stable culture of microalgae in the logarithmic proliferation phase is required. To culture such microalgae, rich inorganic nutrients, irradiation with light or solar irradiation in a quantity sufficient for photosynthesis and clean seawater which protects from contamination (pollution) with various foreign microorganisms are indispensable.

In this regard, the seawater containing deep-sea water is a medium (culture solution) suitable for culture of microalgae in that the seawater containing deep-sea water is a clean seawater rich in inorganic nutrients and free of microorganisms including viruses and bacteria. The present invention has succeeded in providing extremely safe oysters with less contamination through use of microalgae cultured in the seawater containing deep-sea water as feed for oysters, in addition to growing oysters in the seawater containing deep-sea water. In culture of microalgae, microalgae inoculated in the seawater containing deep-sea water can be cultured while they are irradiated with light. The number of microalgal cells after culture was counted with a Thoma hemocytometer under a microscope.

A culturing apparatus including a common air supplier and irradiator can be used. The seawater containing deep-sea water is used for culture of microalgae in the present invention, and, for example, it is preferred to culture 10000000 original cells in a 3 L flask at a seawater temperature of 8° C. to 25° C. with light irradiation at a photon density of 50 to 140 µmol/m$^2$/s and an air flow rate of 5

L/min for 1 to 7 days, and thereafter transfer the resultant into an incubator with a capacity of 30 L to 1000 L and perform expansion culture at a seawater temperature of 8° C. to 25° C., a photon density of 140 to 1400 μmol/m$^2$/s, and an air flow rate of 3 to 80 L/min. Since deep-sea water is rich in inorganic nutrients, it can be directly used for culture, and addition of inorganic salts is not necessarily required. However, proliferation can be promoted through addition of inorganic salts and carbon dioxide gas. It is to be noted that microalgae may be killed if the seawater temperature exceeds 35° C.

In addition, light irradiation can be performed, for example, under conditions of light-dark cycles, or under dark conditions for a certain period of time, or periodically, or in a continuous manner, and the mode can be appropriately selected therefrom in accordance with the condition of culture.

After culture with the seawater containing deep-sea water is initiated, sodium metasilicate or the like, or, what is called a fertilizer can be additionally used to raise the culture rate, as necessary. For the fertilizer, those according to the stage of growth of cultured algae are preferred, and, for example, multi-amino acids and multi-vitamins can be generally used, and the quantity of a fertilizer to be added is preferably about 0.3 to 1.0 mL per liter of the seawater.

In view of the size of microalgae available for oysters in each stage of growth, resistance to contamination with microorganisms, and economic efficiency for mass production, the microalgae to be cultured are preferably the following species.

(a) Planktonic larval stage:
*Chaetoceros gracilis*
*Chaetoceros ceratosporum*
*Chaetoceros calcitrans*
(b) Juvenile shellfish stage:
*Chaetoceros ceratosporum*
*Isochrysis galbana tahiti*
(c) Adult shellfish stage:
*Tetraselmis* sp.
*Phaeodactylum*

The thus obtained microalgae can be fed with the quantity to be added into a water tank adjusted in accordance with the condition of growth of oysters.

The oyster cultivated as described above has high nutrient contents including mineral contents, and low heavy metal contents. The present invention can provide oysters having high mineral contents and low heavy metal contents, and being norovirus-free. A "norovirus-free" oyster refers to an oyster for which no norovirus is detected in real time PCR described in Examples in the present specification.

In particular, the method for cultivating oysters on land according to the present invention enables production of (1) an oyster having a copper content of less than 1000 μg per 100 g of an edible part, a cadmium content of less than 70 μg per 100 g of an edible part, and an iron content of 5000 μg or more per 100 g of an edible part. Accordingly, if an oyster like (1) is found in the market, for example, the oyster is expected to be an oyster produced by using the method for cultivating oysters on land according to the present invention.

The method for cultivating oysters on land according to the present invention also enables production of (2) an oyster having a copper content of less than 1000 μg per 100 g of an edible part, a cadmium content of less than 70 μg per 100 g of an edible part, and a magnesium content of 70000 μg or more per 100 g of an edible part. Accordingly, if an oyster like (2) is found in the market, for example, the oyster is expected to be an oyster produced by using the method for cultivating oysters on land according to the present invention.

Further, the method for cultivating oysters on land according to the present invention enables production of (3) an oyster having a copper content of less than 1000 μg per 100 g of an edible part, a cadmium content of less than 70 μg per 100 g of an edible part, and an iron content of 5000 μg or more per 100 g of an edible part, and being norovirus-free. Accordingly, if an oyster like (3) is found in the market, for example, the oyster is expected to be an oyster produced by using the method for cultivating oysters on land according to the present invention.

The method for cultivating oysters on land according to the present invention also enables production of (4) an oyster having a copper content of less than 1000 μg per 100 g of an edible part, a cadmium content of less than 70 μg per 100 g of an edible part, and a magnesium content of 70000 μg or more per 100 g of an edible part, and being norovirus-free. Accordingly, if an oyster like (4) is found in the market, for example, the oyster is expected to be an oyster produced by using the method for cultivating oysters on land according to the present invention.

EXAMPLES

Now, the present invention will be described in more detail with reference to experiment results.

First, the method for culturing microalgae as feed for oysters is examined, as Experiment 1, by using clean, eutrophic deep-sea water free of pathogenic viruses or bacteria.

Culturing was performed by using deep-sea water, as a microorganism-free, clean seawater, and a culture rack (with a fluorescent lamp and an aeration apparatus) set in a room. First, 5 mL of original cells at a culture density of 10000000 cells/mL was put in a 3 L flask, and aerated at 5 mL/min with light irradiation to initiate culturing at a seawater temperature of 8 to 18° C. When a color appeared 1 to 2 days after the initiation of culturing, 1.5 mL of a fertilizer was added dropwise. Light irradiation was performed with the fluorescent lamp, and aeration was constantly performed at a maximum rate (5 mL/min).

In the culturing, two types of microalgae, the diatom *Chaetoceros gracilis* and the haptophyte *Isochrysis galbana tahiti*, were first used for the original cells and cultured similarly.

The fertilizer used was a commercially available nutrient (KW21: mixed solution of multi-amino acids and multi-vitamins), and about 1.5 mL of KW21 was added into the 3 L flask.

The light irradiation was continuously performed during culturing with the fluorescent lamp at a distance of 10 to 20 cm from the side surface so as to achieve a photon density of 50 to 140 μmol/m$^2$/s.

To supplement microalgae for subculture to be prepared from the original cells to be cultured in the 3 L flask in a room, a 30 L Panlite water tank (a circular, transparent water tank allowing light to transmit therethrough) was additionally used.

When these microalgae proliferated to a culture density of 10000000 cells/mL, 3 to 30 L of them were taken out, and subcultured in 500 L of deep-sea water in a 500 L Panlite water tank in a plastic greenhouse under natural light to ensure a daily production of 30 to 60 L of the microalgae to be charged.

Figure 2:
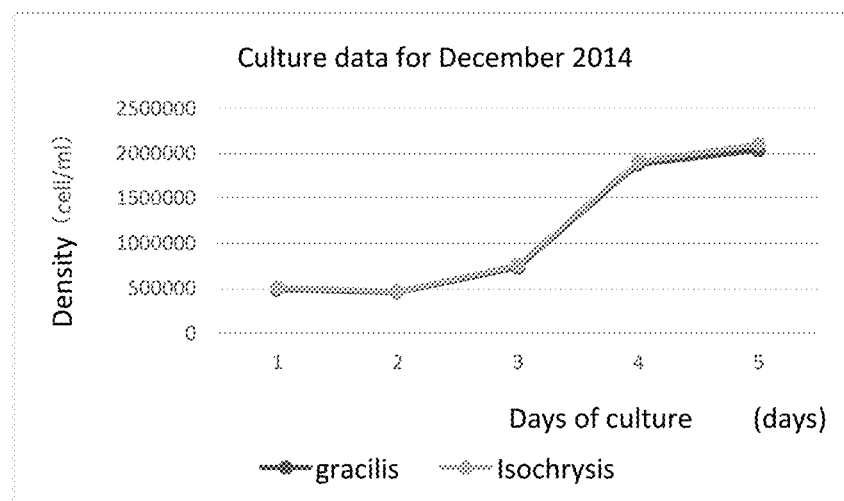
FIG. 2 is a graph showing a relation between days of culturing and cell density when microalgae were cultured in winter (December).

Although the result depends on the type of microalgae and difference in the amount of solar irradiation among seasons and weathers, in this experiment, the culture density in 500 L of deep-sea water reached a little below 1000000 cells/mL to 1000000 cells/mL, which is the most suitable cell density for feeding to oysters, in 3 to 5 days of culturing on average in summer (July, 2014) and in 4 to 5 days of culturing on average in winter (December, 2014). FIGS. 1 and 2 show the increase of culture density for the case of summer and winter, respectively. The water temperature was not high as in summer in culturing in winter, and thus the proliferation progressed slowly until day 7, and the resultant was available as suitable feed.

Subsequently, *Chaetoceros ceratosporum* and *Tetraselmis* sp. were used for the original cells, and cultured as described above to afford a culture solution of each type of microalgae at a cell density of about 100000 to 1000000 cells/mL. The microalgae cultured were used for feeding in accordance with the stage of growth of oysters.

Next, oysters were grown through feeding of the microalgae obtained. Two feeding methods were employed for growing, and an experiment was conducted to examine the condition of growth for different feeding methods. As microalgae for feeding, *Chaetoceros gracilis*, *Chaetoceros ceratosporum*, *Isochrysis galbana tahiti*, and *Tetraselmis* sp. were used in accordance with the stage of growth of oysters.

(1) Food Intake Experiment

First, whether oysters could take in the microalgae obtained was examined.

Figure 3:
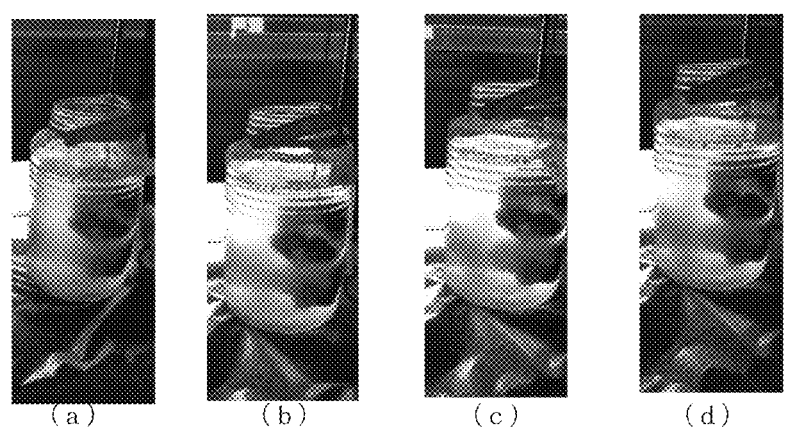
FIG. 3 shows photographs showing results of a food intake experiment.

In the experiment, deep-sea water and 10 juvenile oysters were put in a 4 L container, and the transparency of the seawater after feeding was examined over time. FIG. 3 shows the result. It can be seen from FIG. 3 that the seawater, which initially had a high concentration of the microalgae (*C. gracilis*) and had been brown-colored, became more and more transparent with time through intake by the oysters. This result demonstrates that the oysters completely eaten up the microalgae in the seawater nearly in 3 hours. On the basis of the result of this experiment, the following confirmation experiment was subsequently conducted.

In this experiment, microalgae of *Chaetoceros gracilis* at a cell density of 2290000 cells/mL was fed to 22 oysters originated from Murotsu, Hyogo Prefecture, Japan, in a 200 L San Box, and the microalgal density in the seawater was measured every 1 hour from the initiation of feeding to 3 hours after it. The seawater was allowed to stagnate during this 3-hour period, and thereafter allowed to continuously flow without stagnation with supply of seawater at 600 mL/min, and the flow rate was set at a value corresponding to 4.32 turnovers per 24 hours. After the supply of seawater, the microalgal density in the seawater was again measured 1 hour, 4 hours, 9 hours, and 21 hours after the initiation of supply of seawater (4 hours, 7 hours, 12 hours, and 24 hours after the initiation of feeding, respectively). Measurement of the microalgal density was performed four times (n1 to n4) in each sampling, and the average value was determined. The results are shown in Table 1 and FIG. 4.

TABLE 1

|  | 0 h | 1 h | 2 h | 3 h | 4 h | 7 h | 12 h | 24 h |
| --- | --- | --- | --- | --- | --- | --- | --- | --- |
| n1 | 1320000 | 980000 | 870000 | 830000 | 530000 | 260000 | 20000 | 2000 |
| n2 | 1410000 | 880000 | 860000 | 780000 | 470000 | 330000 | 40000 | 5000 |
| n3 | 1160000 | 1010000 | 990000 | 940000 | 480000 | 390000 | 60000 | 4000 |
| n4 | 1370000 | 990000 | 980000 | 860000 | 680000 | 380000 | 30000 | 1000 |
| Average value | 1315000 | 965000 | 925000 | 852500 | 540000 | 340000 | 37500 | 3000 |
| Standard deviation | 109697 | 58023 | 69522.2 | 67019.9 | 96953.6 | 59441.8 | 17078.3 | 1825.74 |

Figure 4:
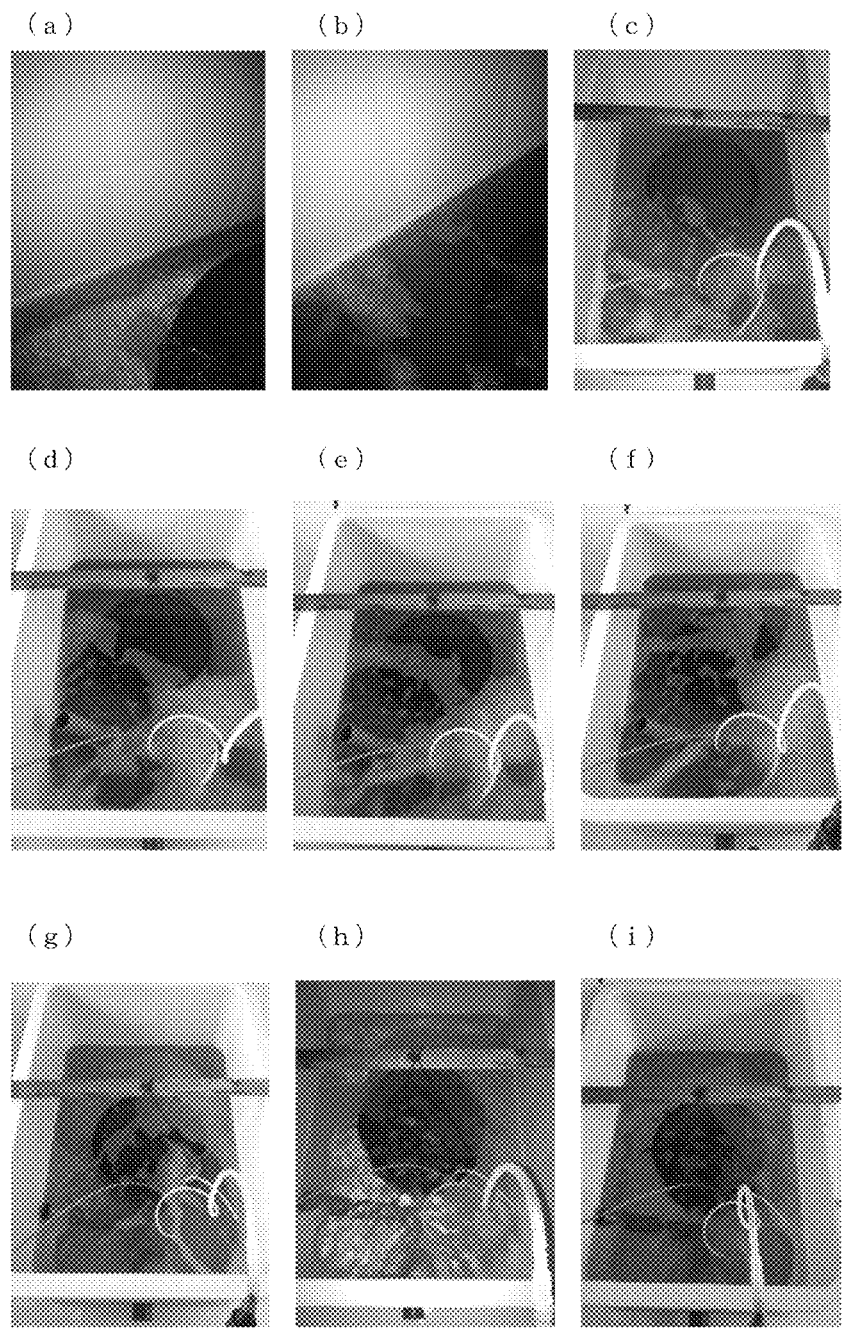
FIG. 4 shows photographs showing results of a food intake experiment.

The photographs in FIG. 4 show the situation presented in Table 1. After feeding to the 22 oysters in the 200 L San Box, the seawater, which had been initially brown-colored because of a high concentration of the microalgae, in the rearing water tank gradually lost the brown color with time, which indicated a process in which the seawater was becoming transparent because of intake by the oysters. The setting of 3-hour stagnation was based on the finding from the feeding experiment shown in the photographs of the above preliminary experiment (FIG. 3) that the microalgae in the seawater were almost totally taken in nearly in 3 hours.

Next, the influence of difference in the feeding method on growing was examined.

(2) Feeding by Using Batch Method—Intermittent Feeding Twice Per Day

In a 200 L water tank containing 180 L of deep-sea water, approximately 50 juvenile oysters (two suspension lines) were grown while the deep-sea water was allowed to continuously flow without stagnation (turnover rate: 2.5 turnovers/day). Microalgae at a cell density of 100000 cells/mL were fed twice per day, specifically, in the morning and in the evening, each in 30 L, the total volume being 60 L. In feeding, the quantity of the seawater in the rearing water tank had been reduced in advance from 180 L to 150 L to prevent flow-out of the microalgae. Thus, the oysters were grown into adult shellfish over 18 months.

In the feeding by using the batch method, the above four types of microalgae which had been cultured to the most suitable concentration were sorted and selected in accordance with the stage of growth to feed, and the same was applied to a dropping method below.

The deep-sea water was allowed to stagnate during feeding, and again allowed to continuously flow without stagnation 3 hours after the stagnation, when the microalgae in the rearing water tank were to be almost totally taken in microalgae in the seawater were completely eaten up by the oysters in 3 hours, and the seawater became colorless and transparent.

(3) Feeding by Using Dropping Method—Continuous Charging

In a 200 L water tank containing 180 L of deep-sea water, approximately 50 juvenile oysters (two suspension lines) were grown. In a barrel set in a dropping apparatus attached to the water tank, 60 L of microalgae at a cell concentration of approximately 100000 cells/mL was put, and fed dropwise from the barrel at a rate of 50 mL/min while deep-sea water was allowed to continuously flow without stagnation (turnover rate: 2.5 turnovers/day). Feeding of the microalgae was initiated in the morning, and the microalgae were dropped while deep-sea water was allowed to continuously flow without stagnation from 10:00 am to 6:00 am in the next day, and feeding was not performed with the dropping apparatus being empty from 6:00 am to 10:00 am.

This operation was repeated, and the oysters were grown into adult shellfish over 18 months. After suspension of feeding, the microalgae in the seawater were taken in by the oysters or discharged by continuous flow without stagnation in 3 hours, and the seawater became colorless and transparent.

Figure 5:
FIG. 5 is a photograph showing results of growing in different feeding methods.

The growth results after 18 months are shown in FIG. 5. FIG. 5 indicates that feeding by using the dropping method, (3), as shown in the right side of the photograph provided a better growth result in terms all of the shell height, shell length, shell width, and weight than feeding by using the batch method, (2), as shown in the left side of the photograph.

On the basis of the above results, oysters grown in the on-land cultivation with feeding by using the dropping method and oysters derived from common marine cultivation were compared to examine the superiority of oysters derived from the on-land cultivation.

Figure 6:
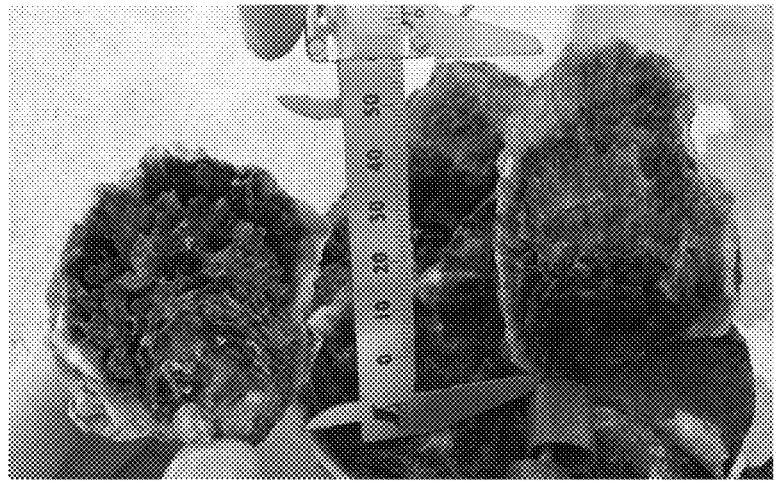
FIG. 6 shows photographs showing the outer appearance, the molluscous part in a shell, and the molluscous part after being shelled, for an oyster derived from the on-land cultivation according to the present invention and an oyster derived from common marine cultivation.
Figure 6:
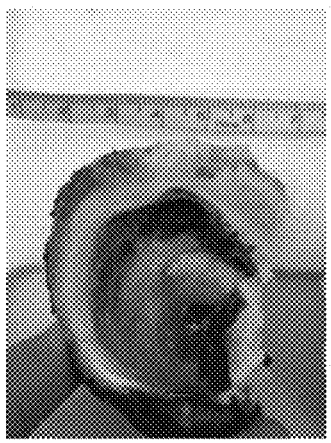
Figure 6:
Figure 6:
Figure 6:

The young shellfish used in a cultivation experiment were rock oysters grown from artificial seedlings (seedling collection) in Uwajima, Ehime Prefecture, Japan. FIG. 6 shows photographs showing the outer appearance for an oyster derived from the on-land cultivation according to the present invention, (a), and an oyster derived from seedling collection in the same season followed by sinking in the same sea area for marine cultivation, (b).

The following can be seen from FIG. 6.

First, the shell of the oyster derived from the on-land cultivation according to the present invention is beautiful with no attachment of a barnacle or the like, and thus the outer appearance is superior to that of the oyster derived from marine cultivation. In the aspect of growth, the oyster derived from the on-land cultivation according to the present invention grows faster than the oyster derived from marine cultivation, and is larger than the oyster derived from marine cultivation in terms all of the shell height, shell length, and shell width. Further, the oyster derived from the on-land cultivation according to the present invention is fatter and larger in a shelled state than the oyster derived from marine cultivation. From these results, it can be understood that an oyster under the on-land cultivation can be grown larger than that under conventional marine cultivation in a given period, and can be grown into an adult shellfish having a size corresponding to the size of an oyster derived from marine cultivation in a shorter period than in the case of marine cultivation. Thus, the on-land cultivation according to the present invention is very advantageous in that oysters under the on-land cultivation grow better than those under marine cultivation, and in-season oysters can be provided throughout the year.

Next, the cleanness and nutritional value were examined for the oysters derived from the on-land cultivation according to the present invention and the oysters derived from common marine cultivation.

The cleanness of an oyster, namely, the presence or absence of contamination with viruses or bacteria was examined as follows.

Comparison was made between oysters distributed as what is called oysters "to be eaten raw", for which viruses and bacteria had been reduced or removed through stocking after harvesting, as oysters derived from marine cultivation, and oysters derived from the on-land cultivation according to the present invention without any treatment after harvesting. The oysters were examined for a norovirus, which is a representative virus in oysters and difficult to remove, and examined for bacterial count, *Escherichia coli* count, and *Vibrio parahaemolyticus*, which are bacteria as defined in standards and criteria for an oyster to be eaten raw in the Food Sanitation Act of Japan. In addition, the oysters were examined for the condition including the presence or absence of odor, with respect to the state, namely, the freshness.

These analyses were commissioned to the General Incorporated Foundation Miyagi Public Health Association, and the results for noroviruses, bacterial count, *E. coli, Vibrio parahaemolyticus*, and the condition were obtained through a real-time PCR method, a standard agar medium method, tube fermentation with EC broth, a culturing method with alkaline peptone broth, and a 5-point test, respectively (subject: 250 g of an edible part, in total). In detection of a norovirus, a case of 10 copies or more was determined as positive. The results are summarized in Table 2.

TABLE 2

| | Examination result | | | |
|---|---|---|---|---|
| Examination item | On-land cultivated oysters | Marine cultivated oysters | Unit | Examination method |
| Bacterial count | less than 300 | less than 300 | /g | standard agar medium method |
| *E. coli* (MPN) | less than 18 | less than 18 | /100 g | tube fermentation with EC broth |
| *Vibrio parahaemolyticus* (MPN) | less than 3.0 | less than 3.0 | /g | culturing method with alkaline peptone broth |
| Condition (odor) | normal | normal | | 5-point test |
| Norovirus Genogroup1 (G1) | not detected | 1.5 | copy/well | real-time PCR method |
| Genogroup2 (G2) | not detected | not detected | copy/well | |

The procedure of the real-time PCR method used for detection of a norovirus was as follows.

(1) Sample: three oysters per test
(2) Pretreatment:

The midgut gland was removed from each of three sample oysters with scissors or the like, and each midgut gland was put in a 5 mL cell disruption tube.

In each of the 5 mL cell disruption tubes, Distilled Water in a quantity equivalent to that of the midgut gland and two stainless steel beads were put, and the samples were subjected to cell disruption with a cell disruption machine (manufactured by TOMY SEIKO CO., LTD., Micro Smash) at 4000 rpm for 1 minute.

The disrupted samples were subjected to centrifugation with cooling at 10000 rpm for 20 minutes, and 200 μL of the supernatant from each sample was used for nucleic acid extraction.

(3) Nucleic Acid (RNA) Extraction

RNA was extracted by using a MagNA Pure LC (manufactured by Roche Molecular Systems, Inc., an automated nucleic acid extractor) with a MagNA Pure Total NA Isolation Kit (manufactured by Roche Molecular Systems, Inc.) to prepare RNA extracts.

(4) Reverse Transcription Reaction

Reverse transcription reaction was performed under the following conditions.

Reverse transcription reaction solutions 1 were prepared from 7.15 μL of Distilled Water, 1.1 μL of Random Primer, and 11 μL of each RNA extract.

Each of the reverse transcription reaction solutions 1 was mixed in a PCR tube, and thereafter left to stand in a thermal cycler at 37° C. for 30 minutes, and then left to stand at 75° C. for 5 minute, and immediately cooled to 4° C.

Subsequently, 9.35 μL of a reaction solution 2 consisting of 4.4 μL of 5×RT buffer (manufactured by GIBCO), 2.2 μL of 0.1 M DTT (manufactured by GIBCO), 0.55 μL of 20 mM dNTP (manufactured by Nippon Gene Co., Ltd.), 1.1 μL of RNase inhibitor, and 1.1 μL of MMLV RTase was add into each PCR tube. The resultants were reacted in a thermal cycler at 37° C. for 60 minutes, and then heated at 99° C. for 5 minutes, and immediately cooled to 4° C. to form cDNA.

(5) Real-Time PCR

A reaction solution shown in a table below was prepared.

After the reaction solution was prepared, measurement and analysis were performed under conditions defined in the Notification No. 1105001, issued by the Director of the Inspection and Safety Division, Department of Food Safety, Pharmaceutical and Food Safety Bureau, Ministry of Health, Labour, and Welfare of Japan, Nov. 5, 2003.

TABLE 3

[Reaction solutions]

| | G1 | G2 |
|---|---|---|
| Distilled Water | 14.8 μL | 16.3 μL |
| TaqMan Universal Maste Mix (manufactured by ABI Inc.) | 25 μL | 25 μL |
| 12.5 μM Primer | COG1F 1.6 μL | COG2F 1.6 μL |
| | COG1R 1.6 μL | COG2R 1.6 μL |
| 5 μM Probe (TaqMan Probe, manufactured by ABI Inc.) | RING1-TP(a) 1.5 μL | RING2-TP 0.5 μL |
| | RING1-TP(b) 0.5 μL | |
| cDNA | 5 μL | 5 μL |

The following can be seen from the above.

The bacterial examination of the oysters derived from the on-land cultivation according to the present invention in accordance with standards and criteria for an oyster to be eaten raw in the Food Sanitation Act of Japan revealed that the number of bacteria in the oysters was under the detection limit, and the results of the examination for noroviruses were each less than 10 copies/well. Thus, the oysters were found to meet the standard for an oyster "to be eaten raw".

In contrast to the oysters derived from the on-land cultivation according to the present invention with no detected norovirus, noroviruses as 1.5 copies/well were detected for the oysters derived from common marine cultivation, even though the oysters had been stocked to remove noroviruses. This indicates that the sea area had been contaminated with noroviruses in the course of cultivation, and the noroviruses had been incorporated in the midgut gland of each oyster, in other words, the oysters had been contaminated. In contrast, the on-land cultivation with deep-sea water according to the present invention provided the oysters with no opportunity of being exposed to a norovirus, and thus the oysters obtained are considered to be highly clean oysters without any virus contamination, or virus-free oysters.

In addition, five examiners in the sensory examination for condition (odor) all rated the oysters derived from the on-land cultivation as normal, which indicates that the oysters derived from the on-land cultivation had grown without deterioration of the oyster taste in the same way as the oysters derived from marine cultivation, and the freshness was maintained without any difference from the oysters derived from marine cultivation.

Next, nutritional value was examined for the oysters obtained.

Figure 7:
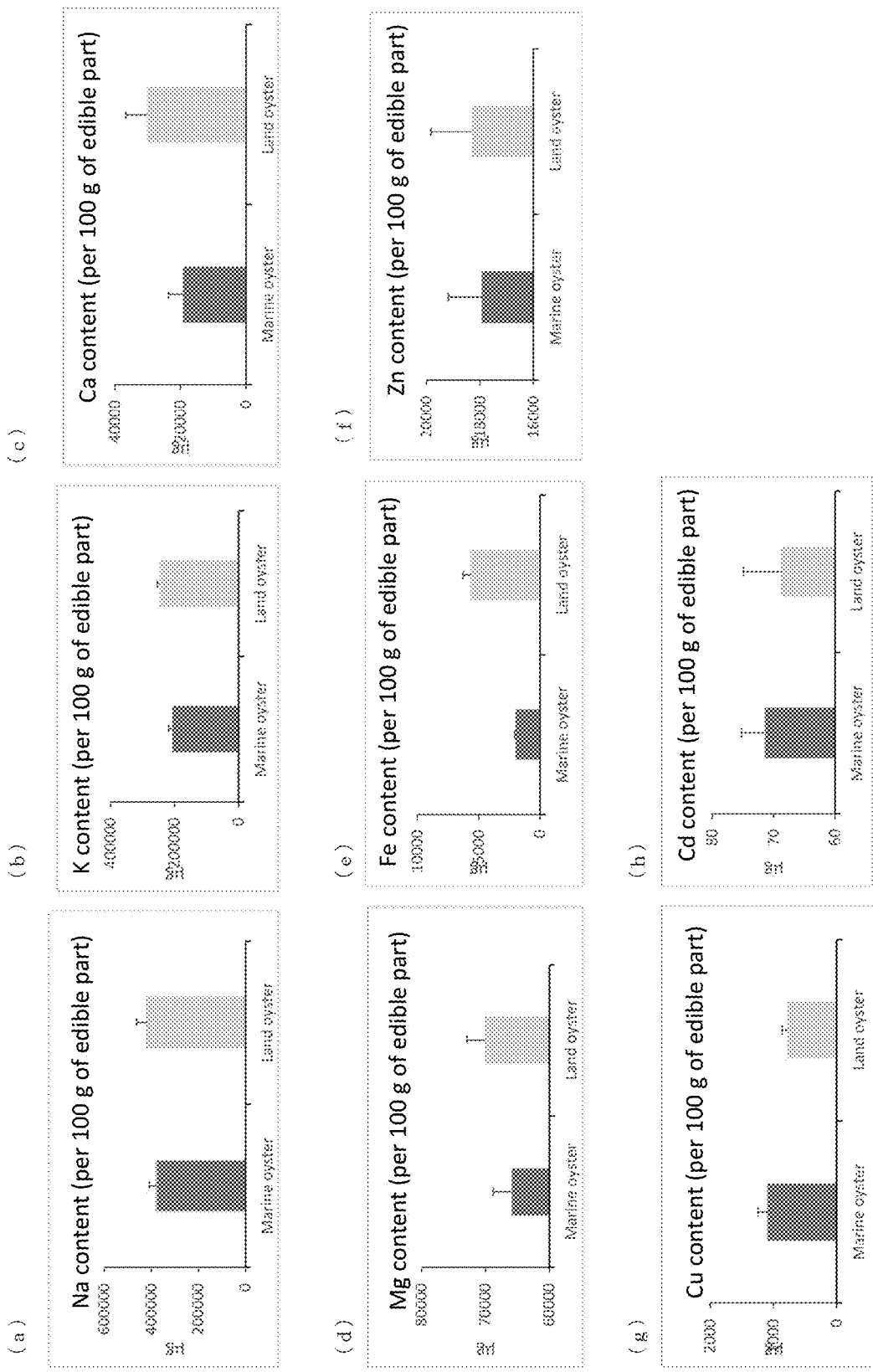
FIG. 7 shows graphs of contents of mineral components for oysters obtained through the on-land cultivation according to the present invention and oysters obtained through common marine cultivation.

To examine nutritional value, the quantities of mineral components of each oyster were analyzed. The oysters derived from the on-land cultivation according to the present invention and the oysters derived from marine cultivation were both subjected to analysis immediately after harvesting. The analysis was commissioned to the Laboratory of Nutrition, Graduate School of Agricultural Science, Tohoku University, and conducted by using an atomic absorption spectrophotometer. The number of subjects was six for both groups of the oysters, which had been cultivated under the same conditions, and the quantity of each component is represented as the average value. As mineral components, (a) sodium, (b) potassium, (c) calcium, (d) magnesium, (e) iron, (0 zinc, (g) copper, and (h) cadmium were analyzed. FIG. 7 shows the results. Then, (h) cadmium was analyzed from the viewpoint of accumulation of a harmful substance, rather than as a nutrient component.

As can be seen from the results of the nutrient component analysis in FIG. 7, the concentrations of the seven mineral components contained per oyster in wet weight for the oysters derived from the on-land cultivation according to the present invention are higher than or comparable to those for the oysters derived from marine cultivation, and the value of cadmium, which is harmful to the human body and accumulates in the midgut gland of a clam, for the oysters derived from the on-land cultivation according to the present invention is lower than that for the oysters derived from marine cultivation, and thus the oysters derived from the on-land cultivation according to the present invention are less contaminated with harmful substances including cadmium.

When the oyster derived from the on-land cultivation according to the present invention with high nutritional value is actually eaten, the taste is never inferior to those of in-season oysters derived from marine cultivation, and rather has an umami comparable to or stronger than those of in-season oysters derived from marine cultivation.

The on-land cultivation method according to the present invention can significantly prevent contamination of oysters, not only through growing oysters into adult shellfish in seawater containing deep-sea water, but also through feeding microalgae cultured in seawater containing deep-sea water, and further prevent poor growth of oysters. Thereby, oysters with combination of extremely low contamination with viruses, bacteria, and heavy metals, and high mineral contents can be obtained. Accordingly, an oyster characterized by any one of the following (1) to (3) can be obtained by using the on-land cultivation method according to the present invention.

(1) An oyster having a copper content of less than 1000 μg per 100 g of an edible part, a cadmium content of less than 70 μg per 100 g of an edible part, and an iron content of 5000 μg or more per 100 g of an edible part.

(2) An oyster having a copper content of less than 1000 μg per 100 g of an edible part, a cadmium content of less than 70 μg per 100 g of an edible part, and a magnesium content of 70000 μg or more per 100 g of an edible part.

(3) The oyster according to (1) or (2), being norovirus-free.

INDUSTRIAL APPLICABILITY

The present invention is on-land cultivation through use of highly clean deep-sea water as seawater for cultivation, and feeding microalgae cultured in deep-sea water rich in nutrient components to oysters, and can provide virus-free oysters with no contamination with bacteria and/or viruses which are derived from the ocean and impact on the human body. Accordingly, the present invention enables stable production of extremely safe oysters having no possibility to cause bad health condition throughout the year. While oysters have been considered as foods with high risk, contamination of sea areas with bacteria and/or viruses is becoming serious year by year. In addition, the increase of seawater temperature due to the environmental change is causing retardation of the growth of oysters. The present invention can be unaffected by such situations.

Handling of oysters has been restricted as they are considered as foods with high risk. People engaged in a school, a hospital, or a hotel have been prohibited from taking oysters, and handling of oysters has been forbidden in some department stores and hotels. In such a circumstance, the present invention can change the concept of oysters in the world through widening the market of oysters, and eventually contribute to protection and maintenance of the culture of eating raw oysters.

The invention claimed is:

1. A method for cultivating oysters on land, the method comprising growing oyster larvae into adult shellfish in seawater comprising deep-sea water in a water tank through feeding microalgae cultured in seawater comprising deep-sea water to the oyster larvae,
    wherein a temperature of the seawater comprising deep-sea water in the water tank is 10° C. to 30° C. for 5 months to 18 months,
    wherein a flow rate of the seawater comprising deep-sea water in the water tank is a flow rate corresponding to 1.0 to 2.0 turnovers for larvae, 1.0 to 2.5 turnovers for juvenile shellfish, and 2.0 to 3.0 turnovers for adult shellfish, and
    wherein a rearing density corresponds to a turnover rate set so that each oyster can take in algae at 50000 to 100000 cells/hour.

2. The method for cultivating oysters on land according to claim 1, wherein the oyster larvae are oyster larvae having no experience of being exposed to a sea area.

3. The method for cultivating oysters on land according to claim 2, wherein the oyster larvae having no experience of being exposed to a sea area are derived from fertilization and hatching in a water tank.

4. The method for cultivating oysters on land according to claim 1, wherein the method comprises the steps of seedling collection, suppression, main suspension, shallow-hanging growing, and harvesting, and wherein the seedling collection is performed in deep-sea water in a water tank.

5. An oyster cultivated by the method for cultivating oysters on land according to claim 1, the oyster having a copper content of less than 1000 μg per 100 g of an edible part, a cadmium content of less than 70 μg per 100 g of an edible part, and an iron content of 5000 μg or more per 100 g of an edible part.

6. The oyster according to claim 5, being norovirus-free.

7. An oyster cultivated by the method for cultivating oysters on land according to claim 1, the oyster having a copper content of less than 1000 μg per 100 g of an edible part, a cadmium content of less than 70 μg per 100 g of an edible part, and a magnesium content of 70000 μg or more per 100 g of an edible part.

8. The oyster according to claim 7, being norovirus-free.

9. The method for cultivating oysters on land according to claim 1, wherein the seawater comprising deep-sea water contains 50% or more of deep-sea water pumped up from the depth of 200 m to 700 m.

10. The method for cultivating oysters on land according to claim 1, wherein the seawater comprising deep-sea water contains 70% or more of deep-sea water pumped up from the depth of 200 m to 700 m.

11. The method for cultivating oysters on land according to claim 1, wherein the seawater comprising deep-sea water contains 90% or more of deep-sea water pumped up from the depth of 200 m to 700 m.

12. The method for cultivating oysters on land according to claim 1, wherein the seawater comprising deep-sea water is pure deep-sea water pumped up from the depth of 200 m to 700 m.

* * * * *